(12) United States Patent
Hackl

(10) Patent No.: US 6,431,660 B2
(45) Date of Patent: Aug. 13, 2002

(54) METHOD FOR AUTOMATICALLY DETECTING THE INSTALLATION POSITION OF BRAKE FORCE GENERATING UNITS OF AN ELECTROMAGNETIC MOTOR VEHICLE BRAKE SYSTEM

(75) Inventor: Stefan Hackl, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/803,757

(22) Filed: Mar. 12, 2001

(30) Foreign Application Priority Data

Mar. 10, 2000 (DE) .......................................... 100 11 635

(51) Int. Cl.⁷ .......................... B60T 7/10; G06F 17/10
(52) U.S. Cl. ........................... 303/3; 188/156; 701/300
(58) Field of Search ........................... 188/72.1, 156, 188/158, 161; 303/3, 15, 20, 171; 701/29, 30, 70, 300

(56) References Cited

U.S. PATENT DOCUMENTS 5,790,966 A * 8/1998 Madau et al. ................. 701/41
6,139,117 A * 10/2000 Shirai et al. ..................... 303/3

FOREIGN PATENT DOCUMENTS

DE       39 30 071 C2    8/1989
DE       42 03 704 C3    8/1993

* cited by examiner

Primary Examiner—Christopher P. Schwartz
(74) Attorney, Agent, or Firm—Laurence A. Greenberg; Werner H. Stemer; Ralph E. Locher

(57) ABSTRACT

A method is provided for automatically detecting the installation position of brake force generating units of an electromechanical motor vehicle brake system. A steered direction of the motor vehicle during cornering is sensed. Wheel speeds occurring at each wheel of the motor vehicle during the cornering are sensed. The wheel speed occurring for each wheel is compared with a position scheme of setpoint wheel speeds which is representative of the direction of cornering. The actual position of the brake force generating units is determined on the basis of the above comparison.

11 Claims, 1 Drawing Sheet

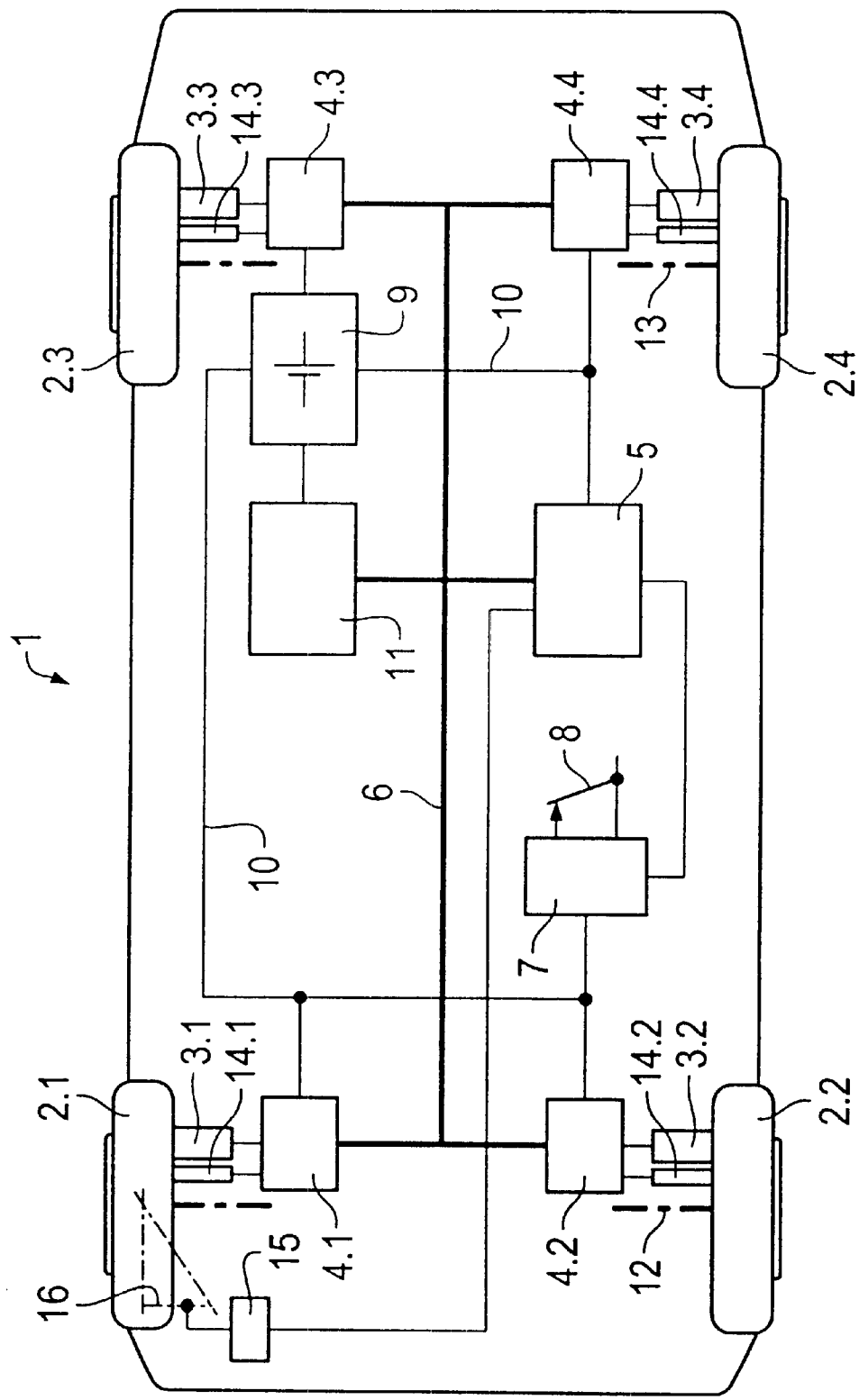

METHOD FOR AUTOMATICALLY DETECTING THE INSTALLATION POSITION OF BRAKE FORCE GENERATING UNITS OF AN ELECTROMAGNETIC MOTOR VEHICLE BRAKE SYSTEM

BACKGROUND OF THE INVENTION

Field of the Invention

The invention relates to a method for automatically detecting the installation position of brake force generating units of an electromagnetic motor vehicle brake system.

With respect to the background of the invention, it is noted that modern automobiles are being equipped with increasing numbers of electronic systems due to continuously rising requirements made in terms of active and passive safety, environmental compatibility and comfort. That applies particularly to driving characteristics which are being influenced to an increasing degree through the use of intelligent electronic control systems by intervening appropriately in the control of the engine and brakes. Examples thereof are anti-lock brake system, traction control system or electronic stability programs. The latter stabilize a vehicle which is tending to veer by selective braking interventions at the wheels.

However, such electronic interventions from the outside into the heretofore-known hydraulic braking system in order to implement the above-mentioned safety concepts make it necessary to use a large number of additional components such as valves, pumps and storage vessels. That makes such brake systems extremely complex and makes it difficult to provide control equipment therefor.

In order to overcome those problems, electromechanical brake systems have recently been developed in which the braking forces on the wheel are generated by using electromechanical transducers. Those transducers are activated through the use of a control system which senses pedal travel and/or activation pressure using suitable sensors and appropriately actuates the brakes. In that respect, the control unit of the brake system can integrate specific functions without difficulty, such as the aforementioned ABS, TCS, various brake boosting functions or the electronic stability program (ESP), into the electromechanical brake system.

In summary, such a "brake-by-wire" system constitutes an external force brake system in which, when braking, the driver merely activates a brake pedal simulator having a movement which is in turn fed through sensors to a superordinate control unit, the "brake-by-wire manager".

Since the brake system is a vehicle system which is extremely relevant to safety, the safety concept, the reliability and the monitoring of that system are of central importance. In that regard, a monitoring computer generally monitors the brake-by-wire manager, the individual electromechanical transducers, the bus system connecting those components and the various sensors involved in the system. It is possible to detect, localize and diagnose fault states through the use of plausibility criteria and check routines within the control and monitoring program. Appropriate emergency functions can be activated as a function of the fault state in order to keep the brake system in a state which is as operationally reliable as possible.

A specific safety problem is presented by the correctly positioned installation of the brake force generating units which are respectively provided with a control device in the vehicle. The term "installation position" is understood herein to be the relationship between the respective brake force generating unit and a quite specific wheel of the vehicle. Particularly in the context of electronic stability programs, all four wheels are in fact manipulated individually by braking interventions in order, for example, to prevent the vehicle from veering off. If a brake force generating unit which should in fact be positioned, for example, at the front left and appropriately actuated is installed at the front right, which is also caused by interchanging the wiring, with the same functional effect, "laterally inverted" actuation of the individual brakes when an ESP intervention occurs would lead to further destabilization instead of to stabilization of the driving characteristics.

In practice, the above-mentioned problems have heretofore been accounted for merely by appropriate checking during installation and appropriate initialization of the control system.

SUMMARY OF THE INVENTION

It is accordingly an object of the invention to provide a method for automatically detecting the installation position of brake force generating units of an electromechanical motor vehicle brake system, which overcomes the hereinafore-mentioned disadvantages of the heretofore-known methods of this general type.

With the foregoing and other objects in view there is provided, in accordance with the invention, a method for automatically detecting the installation position of brake force generating units of an electromechanical motor vehicle brake system, which comprises sensing a steered direction of a motor vehicle during cornering. Wheel speeds occurring at each wheel of the motor vehicle during the cornering are sensed by using speed sensors assigned to respective brake force generating units. The wheel speed occurring for each wheel is compared with a setpoint position scheme of the wheel speeds that is representative of a direction of cornering. Actual positions of the brake force generating Units are determined based on the comparison.

The invention is based on the realization that during cornering significantly different wheel speeds which are dependent on the respective position of the wheel occur at the four wheels of a motor vehicle. In view of this it is therefore appropriate to sense the steering direction of the motor vehicle during cornering and check, on the basis of the knowledge of the steered direction, to what extent the wheel speeds are behaving "according to expectations". If this is not the case, a faulty installation position must clearly be present.

Possible alternatives for sensing the steered direction of the vehicle are acceleration sensors or steering angle sensors. Such sensors are often installed in modern motor vehicles in any case because they are generally necessary for electronic stability programs and similar driving aids.

The verification method according to the invention is preferably carried out only up to a specified maximum steering angle and a specified maximum cornering speed in order to avoid incorrect detections due to limiting case effects. For example, it is possible for the setpoint position scheme of the wheel speeds to change at a very large steering angle. This is the case, for example, if the right-rear wheel describes a tighter curve than the left-front wheel on a left-hand curve.

Other features which are considered as characteristic for the invention are set forth in the appended claims.

Although the invention is illustrated and described herein as embodied in a method for automatically detecting the installation position of brake force generating units of an electromagnetic motor vehicle brake system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a highly diagrammatic and schematic view of a vehicle with an electromechanical brake system.

DESCRIPTION OF THE PREFERRED EMBODIMENTS

Referring now in detail to the single FIGURE of the drawing, there is seen a plan view of an automobile 1 with four wheels 2.1, 2.2, 2.3 and 2.4. Each wheel 2.1 to 2.4 is provided with a brake force generating unit in the form of an electromechanical transducer 3.1 to 3.4, which can generate a high braking force at a respective wheel 2.1 to 2.4 within a tenth of a second, given appropriate actuation. The electromechanical transducers 3.1 to 3.4 are respectively provided with an electronic supervisory unit 4.1 to 4.4 in order to activate them.

The heart of the electromechanical brake system in the automobile or vehicle 1 is a central control unit 5. On one hand, the central control unit 5 is connected through a CAN bus 6 to the supervisory units 4.1 to 4.4 of the individual electromechanical transducers 3.1 to 3.4. On the other hand, the control unit 5 is coupled to a brake pedal sensor unit 7 which senses a travel and/or activation force of a brake pedal 8 and converts it into corresponding electrical signals.

In addition, a power supply 9 is provided in the form of a battery for an electrical system of the vehicle. The battery is responsible for supplying power to the individual components. This is indicated by a network of power supply lines 10. The power source is associated with a power detector 11 through the use of which a maximum power that can be made available to the power supply 9 can be sensed. A corresponding signal is fed to the control unit 5.

Finally, various sensors are provided for sensing parameters which are relevant for the position detection method according to the invention. Wheel speed sensors 14.1 to 14.4 are assigned to the respective brake force generating units on a front axle 12 and a rear axle 13 of the vehicle 1. The wheel speed sensors 14.1 to 14.4 are present in any case in the form of conventional ABS systems, irrespective of whether the brake system is a conventional hydraulic one or an electromechanical one according to the latest developments. These wheel speed sensors 14.1 to 14.4 transmit corresponding signals to the supervisory units 4.1 to 4.4 which convey information on rotational speed U of the respective wheel in data form to the control unit 5.

The entire system is completed by a steering angle sensor 15 (also illustrated in highly schematic form) which transmits information on size and direction of a steering angle 16 of at least one front wheel 2.1 to the control unit 5.

The method according to the invention for automatically detecting the installation position of the brake force generating units 3.1/4.1 to 3.4/4.4 can be described as follows:

A "normal case" in which the control unit 5 is correctly initialized and the brake force generating units 3.1/4.1 to 3.4/4.4 are correctly installed is taken as a starting point. This means that the control unit 5 supervises the brake force generating unit 3.1/4.1 as the brake unit of the right-front wheel 2.1, the unit 3.2/4.2 as the brake unit of the left-front wheel 2.2, the unit 3.3/4.3 as the brake unit of the right-rear wheel 2.3 and the brake force generating unit 3.4/4.4 as that of the left-rear wheel 2.4. The correctness of this relationship can be verified automatically during driving and in particular virtually already at a first test drive of a new vehicle at the plant. When cornering, for example to the left, this is sensed by the steering angle sensor 15 and a corresponding signal is output to the control unit 5. If a maximum steering angle 16, for example of 15° and a maximum cornering speed, for example of 50 km/h is not exceeded, the wheel speeds occurring at each wheel 2.1 to 2.4 of the vehicle 1 are sensed by using the wheel speed sensors 14.1 to 14.4 after the sensing of the steering direction "left", and are assigned to each wheel as follows:

$U_{vr}$=rotational speed of the right-front wheel (2.1)
$U_{hr}$=rotational speed of the right-rear wheel (2.3)
$U_{vl}$=rotational speed of the left-front wheel (2.2), and
$U_{hl}$=rotational speed of the left-rear wheel (2.4).

Given a correct mounting and a correct installation position of the brake force generating units 3.1/4.1 to 3.4/4.4, the wheel speeds during the exemplary cornering to the left comply with the following relationship in their position scheme:

$$U_{vr} > U_{hr} > U_{vl} > U_{hl}.$$

Given a faulty installation, for example if the initialization of the brake units 3.1/4.1 and 3.2/4.2 is interchanged on the front axle 12, during cornering to the left, a relationship $U_{vl} > U_{hr} > U_{vr} > U_{hl}$ will be obtained for the actual measured values of the wheel speeds, which do not comply with the position scheme for setpoint wheel speeds for cornering to the left. This can be detected directly by the control unit 5.

If the control program is appropriately configured, this interchanged assignment can be corrected automatically by the control unit 5 or some other participating subordinate control device during the calculation of control variables for the brake system, such as are necessary for an ABS or ESP, for example. However, the control unit will at least generate any appropriate fault message and issue it so that maintenance personnel can be informed that a mounting fault has occurred.

The position scheme of the wheel speeds for cornering to the right comply, as for the rest, with the following relationship:

$$U_{vl} > U_{hl} > U_{vr} > U_{hr}.$$

I claim:
1. A method for automatically detecting the installation position of brake force generating units of an electromechanical motor vehicle brake system, which comprises the following method steps:
sensing a steered direction of a motor vehicle during cornering;
sensing wheel speeds occurring at each wheel of the motor vehicle during the cornering using speed sensors assigned to respective brake force generating units;
performing a comparison of the wheel speed occurring for each wheel with a setpoint position scheme of the wheel speeds representative of a direction of cornering; and determining actual positions of the brake force-generating units based on the comparison.

2. The method according to claim 1, which further comprises carrying out the step of sensing the steered direction of the vehicle with an accelerator sensor.

3. The method according to claim 1, which further comprises carrying out the step of sensing the steered direction of the vehicle with a sensor detecting a steering angle.

4. The method according to claim 1, which further comprises carrying out the step of sensing the steered direction of the vehicle only up to a specified maximum steering angle.

5. The method according to claim 2, which further comprises carrying out the step of sensing the steered direction of the vehicle only up to a specified maximum steering angle.

6. The method according to claim 3, which further comprises carrying out the step of sensing the steered direction of the vehicle only up to a specified maximum steering angle.

7. The method according to claim 1, which further comprises carrying out the step of sensing the steered direction of the vehicle only up to a specified maximum cornering speed.

8. The method according to claim 2, which further comprises carrying out the step of sensing the steered direction of the vehicle only up to a specified maximum cornering speed.

9. The method according to claim 3, which further comprises carrying out the step of sensing the steered direction of the vehicle only up to a specified maximum cornering speed.

10. The method according to claim 1, which further comprises causing the setpoint position scheme of wheel speeds for cornering to the left to comply with the following relationship:

$$U_{vr} > U_{hr} > U_{vl} > U_{hl},$$

where:
 $U_{vr}$ is the rotational speed of the right-front wheel;
 $U_{hr}$ is the rotational speed of the right-rear wheel;
 $U_{vl}$ is the rotational speed of the left-front wheel; and
 $U_{hl}$ is the rotational speed of the left-rear wheel.

11. The method according to claim 1, which further comprises causing the set point position scheme of wheel speeds for cornering to the right to comply with the following relationship:

$$U_{vl} > U_{hl} > U_{vr} > U_{hr},$$

where:
 $U_{vr}$ is the rotational speed of the right-front wheel;
 $U_{hr}$ is the rotational speed of the right-rear wheel;
 $U_{vl}$ is the rotational speed of the left-front wheel; and
 $U_{hl}$ is the rotational speed of the left-rear wheel.

* * * * *